(12) United States Patent  
Morikawa

(10) Patent No.: US 7,729,023 B2  
(45) Date of Patent: Jun. 1, 2010

(54) IMAGE READING APPARATUS AND IMAGE READING METHOD

(75) Inventor: Daisuke Morikawa, Abiko (JP)

(73) Assignee: Canon Kabushiki Kaisha (JP)

( * ) Notice: Subject to any disclaimer, the term of this patent is extended or adjusted under 35 U.S.C. 154(b) by 228 days.

(21) Appl. No.: 11/857,534

(22) Filed: Sep. 19, 2007

(65) Prior Publication Data

US 2008/0068682 A1 Mar. 20, 2008

(30) Foreign Application Priority Data

Sep. 19, 2006 (JP) ............................. 2006-253208

(51) Int. Cl.
- *G03F 3/08* (2006.01)
- *H04N 1/60* (2006.01)
- *H04N 1/40* (2006.01)
- *H04N 1/00* (2006.01)
- *G06K 9/40* (2006.01)

(52) U.S. Cl. ..................... 358/521; 358/1.9; 358/474; 358/448; 358/461; 358/406; 358/3.26; 358/3.06; 382/274; 382/275; 399/38; 399/39; 399/40; 399/41; 399/49

(58) Field of Classification Search ............... 358/521, 358/1.9, 474, 448, 461, 426, 406, 3.26, 3.06; 382/274, 275, 232, 312, 319; 399/39, 49, 399/15, 40, 41, 38, 45

See application file for complete search history.

(56) References Cited

U.S. PATENT DOCUMENTS 6,959,157 B2 * 10/2005 Nakayama ................. 399/39  
2005/0206968 A1 * 9/2005 Sodeura et al. ............ 358/474

FOREIGN PATENT DOCUMENTS

| JP | 2001-157052 A | 6/2001 |
| JP | 2001-285595 A | 10/2001 |
| JP | 2004-187144 A | 7/2004 |

* cited by examiner

*Primary Examiner*—Charlotte M Baker  
(74) *Attorney, Agent, or Firm*—Rossi, Kimms & McDowell LLP

(57) ABSTRACT

An image reading apparatus which is capable of preventing images read from a double-sided original from suffering an in-surface color irregularity on each of images read from the respective opposite sides of a double-sided original and a color difference between the front and reverse. A CCD line sensor reads a front-side original image. An image processing ASIC calculates shading correction data for performing shading correction on original image data read from the original image by the CCD line sensor, based on read luminance values obtained by the CCD line sensor by reading a plurality of halftone gradation patches thereon on a correction chart. The shading correction data calculated by the image processing ASIC is corrected based on read luminance values associated, respectively, with at least two of the gradation patches.

10 Claims, 20 Drawing Sheets

FIG. 6

| DENSITY | REFLECTANCE | LEFT | | | CENTER | | | RIGHT | | |
|---|---|---|---|---|---|---|---|---|---|---|
| | | R | G | B | R | G | B | R | G | B |
| 0.07 | 0.84 | 251.5 | 249.1 | 238.9 | 253.0 | 251.2 | 241.4 | 251.4 | 248.9 | 238.7 |
| 0.15 | 0.71 | 212.1 | 207.4 | 197.9 | 214.3 | 209.4 | 199.9 | 212.4 | 207.8 | 198.3 |
| 0.32 | 0.48 | 139.7 | 135.2 | 127.8 | 141.1 | 136.4 | 129.0 | 139.4 | 135.1 | 127.9 |
| 0.45 | 0.36 | 99.1 | 95.3 | 89.9 | 100.2 | 96.2 | 90.8 | 99.7 | 96.0 | 90.4 |
| 0.61 | 0.25 | 67.1 | 64.1 | 60.6 | 68.1 | 64.6 | 61.2 | 68.0 | 65.0 | 61.6 |
| 0.79 | 0.16 | 46.7 | 44.0 | 41.7 | 47.3 | 44.4 | 42.1 | 46.3 | 43.8 | 41.6 |
| 1 | 0.1 | 28.0 | 25.7 | 24.3 | 28.2 | 25.9 | 24.5 | 28.0 | 25.9 | 24.5 |
| 1.28 | 0.05 | 15.4 | 13.6 | 12.6 | 15.5 | 13.6 | 12.6 | 15.2 | 13.7 | 12.8 |
| 1.41 | 0.04 | 11.4 | 9.6 | 8.8 | 11.5 | 9.6 | 8.8 | 11.2 | 9.6 | 8.9 |
| 1.79 | 0.02 | 5.7 | 5.2 | 5.4 | 5.8 | 5.2 | 5.3 | 5.3 | 5.1 | 5.2 |

IN-SURFACE COMPARISON OF DENSITY LINEARITY CHARACTERISTICS

FIG. 8

| PATCH NO. | DIFFERENCE BEFORE CORRECTION | | | DIFFERENCE AFTER CORRECTION | | |
|---|---|---|---|---|---|---|
| | R | G | B | R | G | B |
| 1 | 1.6 | 2.3 | 2.7 | 0.9 | 0.2 | 0.3 |
| 2 | 2.2 | 2.0 | 2.1 | 0.0 | 0.1 | 0.0 |
| 3 | 1.7 | 1.3 | 1.2 | 0.1 | 0.2 | 0.2 |
| 4 | 1.0 | 0.8 | 0.9 | 0.2 | 0.4 | 0.3 |
| 5 | 0.8 | 1.0 | 1.1 | 0.2 | 0.0 | 0.1 |
| 6 | 1.0 | 0.6 | 0.5 | 0.1 | 0.2 | 0.3 |
| 7 | 0.3 | 0.4 | 0.2 | 0.4 | 0.3 | 0.4 |
| 8 | 0.4 | 0.1 | 0.3 | 0.2 | 0.4 | 0.2 |
| 9 | 0.4 | 0.1 | 0.2 | 0.2 | 0.4 | 0.3 |
| 10 | 0.5 | 0.1 | 0.2 | 0.0 | 0.3 | 0.3 |

FIG. 10

| DENSITY | REFLECTANCE | CCD-SIDE READ LUMINANCE VALUE | | | CIS-SIDE READ LUMINANCE VALUE | | |
|---|---|---|---|---|---|---|---|
| | | R | G | B | R | G | B |
| 0.07 | 0.84 | 252.33 | 248.03 | 245.74 | 254.61 | 246.73 | 241.93 |
| 0.15 | 0.71 | 213.62 | 206.27 | 204.16 | 215.60 | 203.46 | 197.58 |
| 0.32 | 0.48 | 139.82 | 134.00 | 131.16 | 137.38 | 129.49 | 123.47 |
| 0.45 | 0.36 | 100.68 | 96.19 | 93.72 | 98.13 | 92.54 | 87.05 |
| 0.61 | 0.25 | 69.43 | 65.87 | 64.42 | 65.71 | 61.48 | 57.56 |
| 0.79 | 0.16 | 46.66 | 43.75 | 42.80 | 42.38 | 39.08 | 36.55 |
| 1 | 0.1 | 29.40 | 27.08 | 26.34 | 25.86 | 23.31 | 21.54 |
| 1.28 | 0.05 | 17.41 | 15.43 | 14.74 | 13.60 | 11.68 | 10.22 |
| 1.41 | 0.04 | 13.31 | 11.56 | 10.80 | 9.63 | 7.88 | 6.68 |
| 1.79 | 0.02 | 7.30 | 6.62 | 6.61 | 3.37 | 3.01 | 3.01 |

FIG. 13

| DENSITY | REFLECTANCE | CCD-SIDE READ LUMINANCE VALUE | | | CIS-SIDE READ LUMINANCE VALUE AFTER CORRECTION | | |
|---|---|---|---|---|---|---|---|
| | | R | G | B | R | G | B |
| 0.07 | 0.84 | 252.33 | 248.03 | 245.74 | 251.58 | 249.37 | 249.16 |
| 0.15 | 0.71 | 213.62 | 206.27 | 204.16 | 213.62 | 206.27 | 204.16 |
| 0.32 | 0.48 | 139.82 | 134.00 | 131.16 | 137.51 | 132.59 | 128.95 |
| 0.45 | 0.36 | 100.68 | 96.19 | 93.72 | 99.31 | 95.78 | 91.99 |
| 0.61 | 0.25 | 69.43 | 65.87 | 64.42 | 67.76 | 64.84 | 62.06 |
| 0.79 | 0.16 | 46.66 | 43.75 | 42.80 | 45.06 | 42.53 | 40.74 |
| 1.00 | 0.10 | 29.40 | 27.08 | 26.34 | 28.98 | 26.82 | 25.50 |
| 1.28 | 0.05 | 17.41 | 15.43 | 14.74 | 17.05 | 15.23 | 14.02 |
| 1.41 | 0.04 | 13.31 | 11.56 | 10.80 | 13.19 | 11.45 | 10.43 |
| 1.79 | 0.02 | 7.30 | 6.62 | 6.61 | 7.10 | 6.59 | 6.71 |

FIG. 14

| PATCH No. | DIFFERENCE BEFORE CORRECTION | | | DIFFERENCE AFTER CORRECTION | | |
|---|---|---|---|---|---|---|
| | R | G | B | R | G | B |
| 1 | 2.28 | 1.31 | 3.82 | 0.79 | 1.33 | 3.44 |
| 2 | 1.98 | 2.82 | 6.58 | 0.00 | 0.00 | 0.00 |
| 3 | 2.44 | 4.51 | 7.69 | 2.24 | 1.40 | 2.25 |
| 4 | 2.55 | 3.64 | 6.67 | 1.26 | 0.39 | 1.79 |
| 5 | 3.72 | 4.39 | 6.86 | 1.53 | 1.01 | 2.43 |
| 6 | 4.28 | 4.67 | 6.26 | 1.44 | 1.20 | 2.15 |
| 7 | 3.54 | 3.77 | 4.80 | 0.24 | 0.23 | 0.92 |
| 8 | 3.81 | 3.75 | 4.51 | 0.17 | 0.17 | 0.81 |
| 9 | 3.68 | 3.68 | 4.12 | 0.07 | 0.08 | 0.47 |
| 10 | 3.92 | 3.61 | 3.60 | 0.00 | 0.00 | 0.00 |
| AVERAGE | 3.22 | 3.61 | 5.49 | 0.78 | 0.58 | 1.43 |

FIG. 16

| DENSITY | REFLECTANCE | CCD-SIDE READ LUMINANCE VALUE AFTER CORRECTION | | | CIS-SIDE READ LUMINANCE VALUE AFTER CORRECTION | | |
|---|---|---|---|---|---|---|---|
| | | R | G | B | R | G | B |
| 0.07 | 0.84 | 252.33 | 248.03 | 245.74 | 251.58 | 249.37 | 249.16 |
| 0.15 | 0.71 | 213.62 | 206.27 | 204.16 | 213.62 | 206.27 | 204.16 |
| 0.32 | 0.48 | 139.82 | 134.00 | 131.16 | 137.51 | 132.59 | 128.95 |
| 0.45 | 0.36 | 100.68 | 96.19 | 93.72 | 100.68 | 96.19 | 93.72 |
| 0.61 | 0.25 | 69.43 | 65.87 | 64.42 | 68.70 | 65.11 | 63.23 |
| 0.79 | 0.16 | 46.66 | 43.75 | 42.80 | 45.68 | 42.71 | 41.50 |
| 1.00 | 0.10 | 29.40 | 27.08 | 26.34 | 28.40 | 27.08 | 26.34 |
| 1.28 | 0.05 | 17.41 | 15.43 | 14.74 | 17.30 | 15.38 | 14.48 |
| 1.41 | 0.04 | 13.31 | 11.56 | 10.80 | 13.38 | 11.56 | 10.77 |
| 1.79 | 0.02 | 7.30 | 6.62 | 6.61 | 7.20 | 6.66 | 6.93 |

FIG. 17

| DENSITY | DIFFERENCE BEFORE CORRECTION | | | DIFFERENCE AFTER CORRECTION | | |
|---|---|---|---|---|---|---|
| | R | G | B | R | G | B |
| 0.07 | 2.28 | 1.31 | 3.82 | 0.06 | 2.11 | 4.24 |
| 0.15 | 1.98 | 2.82 | 6.58 | 0.00 | 0.00 | 0.00 |
| 0.32 | 2.44 | 4.51 | 7.69 | 3.70 | 2.72 | 3.58 |
| 0.45 | 2.55 | 3.64 | 6.67 | 0.00 | 0.00 | 0.00 |
| 0.61 | 3.72 | 4.39 | 6.86 | 2.01 | 1.97 | 2.45 |
| 0.79 | 4.28 | 4.67 | 6.26 | 3.18 | 3.13 | 3.45 |
| 1.00 | 3.54 | 3.77 | 4.80 | 0.00 | 0.00 | 0.00 |
| 1.28 | 3.81 | 3.75 | 4.51 | 0.06 | 0.08 | 0.45 |
| 1.41 | 3.68 | 3.68 | 4.12 | 0.14 | 0.03 | 0.29 |
| 1.79 | 3.92 | 3.61 | 3.60 | 0.00 | 0.00 | 0.00 |
| AVERAGE | 3.22 | 3.61 | 5.49 | 0.92 | 1.00 | 1.45 |

COMPARISON OF DENSITY LINEARITY CHARACTERISTICS
BETWEEN GLOSSY ORIGINAL AND NON-GLOSSY ORIGINAL

COMPARISON OF DENSITY LINEARITY CHARACTERISTICS
BETWEEN GLOSSY ORIGINAL AND NON-GLOSSY ORIGINAL

IMAGE READING APPARATUS AND IMAGE READING METHOD

BACKGROUND OF THE INVENTION

1. Field of the Invention

The present invention relates to an image reading apparatus for a digital copying machine, a facsimile machine, a scanner, or the like, and an image reading method executed by the image reading apparatus, and more particularly to an image reading apparatus configured to be capable of performing simultaneous double-sided reading for simultaneously reading both sides of an original during one-time conveyance of the original, and an image reading method executed by the image reading apparatus.

2. Description of the Related Art

Recently, a series of system developments concerning filing applications for various official certificates and notifications to public offices have been being vigorously promoted based on the electronic government concept. Such movement can also be widely seen among private companies, and with a rise in interest in security of personal information and an increase in demand for security of secret information, attention has been just increasingly given to security techniques for paper documents.

A typical example of the security techniques is a forgery prevention technique, and also mentioned as important security techniques are a security printing technique of disabling copying of a secret document by embedding a fine and complicated structure in image data and a determination technique of accurately reading a security document to thereby determine whether or not the security document is a secret document.

In offices, copying machines are most generally used for printing paper documents, and means for preventing forgery of paper money and unauthorized copying of secret documents are indispensable to the copying machines. Especially, the image reading apparatus of each copying machine is required to perform highly accurate reading.

As an image reading apparatus used e.g. in a copying machine, there has been known one which performs so-called "moving original reading" in which originals are conveyed onto an original platen glass, one by one, by an automatic document feeder and an original image on each of the originals is read by exposing the original to light by an exposure device fixedly disposed on the conveying path. This technique has been disclosed e.g. in Japanese Laid-Open Patent Publication (Kokai) No. 2001-285595. Further, another image reading apparatus has been known in which two image readers are provided for enhancement of the productivity of the image reading apparatus, so as to enable both sides of an original to be read during one-time conveyance of the original (see e.g. Japanese Laid-Open Patent Publication (Kokai) No. 2004-187144).

However, in the image reading apparatus configured to read both sides of an original during one-time conveyance, differences between image reading positions of the respective image readers can cause variation in the amount of light used for double-sided original reading. Further, differences (front-side and reverse-side reading level differences) can occur between read values obtained by reading the front side of an original and read values obtained by reading the reverse side of the original.

To correct the front-side and reverse-side reading level differences and the reading position-dependent variation in the light amount in the double-sided original reading, there has been proposed a method in which shading correction is performed using reference white plates so as to obtain equal values even in different reading modes. This technique is disclosed e.g. in Japanese Laid-Open Patent Publication (Kokai) No. 2001-157052.

However, to perform matching of reading characteristics for correction of shading correction data, Japanese Laid-Open Patent Publication (Kokai) No. 2001-157052 specifically discloses nothing more than a technique of performing uniform gain adjustment in the main scanning direction.

To read such a paper document formed by the additional use of a security technique as described above, strict in-surface uniformity (uniformity over one surface of an original) of the read data is required, and hence the correction technique mentioned above is not enough to cope with the reading of such a security document. Further, the correction technique also suffers from the problem of being incapable of coping with a case in which the front side of an original and the reverse side of the same are largely different in reading characteristics.

Furthermore, an image reading apparatus employing the correction technique is required to have not only a system for shading correction, but also a circuit for correcting shading correction data, which inevitably makes the apparatus large-sized and complicated in configuration, thereby causing an increase in manufacturing costs. Particularly in the case of reading both sides of an original by the moving original reading method, read values obtained by reading the front side of an original differ from read values obtained by reading the reverse side of the same, which brings about the problems of a density difference occurring in monochrome original copying and a color difference occurring in color original copying.

SUMMARY OF THE INVENTION

The present invention provides an image reading apparatus and an image reading method which are capable of preventing images read from a double-sided original from suffering an in-surface color irregularity (density irregularity) on each of images read from the respective opposite sides of a double-sided original and/or color differences (density differences) between the read front-side and reverse-side images.

In a first aspect of the present invention, there is provided an image reading apparatus comprising a reader unit configured to read an original image, and a correction unit configured to perform correction on original image data read from the original image by the reader unit, wherein the correction unit corrects the original image data based on a reference original having at least two different density patches.

The image reading apparatus according to the present invention is provided with the correction unit configured to perform correction on original image data read from the original image by the reader unit. Further, the correction unit corrects the original image data based on a reference original having at least two different density patches.

As a consequence, it is possible to prevent an in-surface color irregularity (density irregularity) and color differences (density differences) between the front and rear sides from occurring in front-side and reverse-side images read from the double-sided original.

The correction unit corrects the original image data such that differences in a density linearity characteristic indicative of relation between reflectance and luminance in a main scanning direction are reduced.

The correction unit can perform a shading correction on original image data read from the original image by the reader unit by correcting shading correction data for shading correction based on read data obtained by reading the reference original having at least two different density patches.

The shading correction data comprises an adjusted gain value and an adjusted black offset value calculated for each pixel, and the correction unit calculates a gain correction coefficient by which the adjusted gain value is to be multiplied and a black offset correction value to be added to the adjusted black offset value.

The reader unit includes a first reader unit configured to read a front-side image of an original, and a second reader unit configured to read a reverse-side image of the original, and the correction unit corrects the original image data based on first and second read data obtained by reading the reference original having at least two different density patches by the first and second reader units.

The correction unit corrects the original image data such that differences in a density linearity characteristic indicative of relation between reflectance and luminance, between the first and second image data, are reduced.

The correction unit can perform shading correction on respective first and second original image data read from the original image by the first and second reader units, respectively, by correcting first and second shading correction data for shading correction based on read data obtained by reading the reference original having at least two different density patches by the first and second reader unit.

The shading correction data comprises an adjusted gain value and an adjusted black offset value calculated for each pixel, and the correction unit calculates a gain correction coefficient by which the adjusted gain value is to be multiplied and a black offset correction value to be added to the adjusted black offset value.

The correction unit can correct a gain and an offset in an original reflectance-read luminance characteristic of the reader unit, on a color component-by-color component basis, and the correction unit can correct the gain and the offset in the original reflectance-read luminance characteristic of the reader unit, on a color component-by-color component basis, based on image data read by the reader unit from a reference original, such that differences in the original reflectance-read luminance characteristic in a main scanning direction of the reader unit are reduced.

The reference original comprises at least two gradation images different in reflectance, and the correction unit performs linear approximation of the original reflectance-read luminance characteristic of the reader unit, based on image data of two different gradation images read by the reader unit.

The reader unit includes a first reader unit configured to read one side of an original and a second reader unit configured to read the other side of the original, and the correction unit corrects a gain and an offset in an original reflectance-read luminance characteristic of each of the first and second reader units, on a color component-by-color component basis, the correction unit correcting the gain and offset in the original reflectance-read luminance characteristic of each of the first and second reader units, on a color component-by-color component basis, based on image data read by the first and second reader units from a reference original.

The reference original comprises at least two gradation images different in reflectance, and the correction unit performs linear approximation of the original reflectance-read luminance characteristics of the respective first and second reader units, based on image data of two different gradation images read by each of the first and second reader units.

In a second aspect of the present invention, there is provided a method of reading an original image using an image reading apparatus, comprising a reading step of reading an original image, and a correction step of performing correction on original image data read from the original image by the reader unit, wherein the correction step includes correcting the original image data based on a reference original having at least two different density patches.

The features and advantages of the invention will become more apparent from the following detailed description taken in conjunction with the accompanying drawings.

BRIEF DESCRIPTION OF THE DRAWINGS

FIG. 6 is a table showing examples of correction chart read values.

FIG. 8 is a table showing differences between read values before matching (correction) of the read values in a main scanning direction and differences between the read values after the matching (correction).

FIG. 10 is a table showing examples of correction chart read values.

FIG. 13 is a table showing CCD-side read luminance values obtained before correction of shading correction data and CIS-side luminance values obtained after the correction.

FIG. 14 is a diagram showing difference values before and after the correction of the shading correction data.

FIG. 16 is a diagram showing CCD-side read luminance values obtained before four-point correction and CIS-side luminance values obtained after the four-point correction.

FIG. 17 is a diagram showing read luminance differences before and after the four-point correction.

DETAILED DESCRIPTION OF THE PREFERRED EMBODIMENTS

The present invention will now be described in detail with reference to the drawings showing preferred embodiments thereof.

Figure 1:
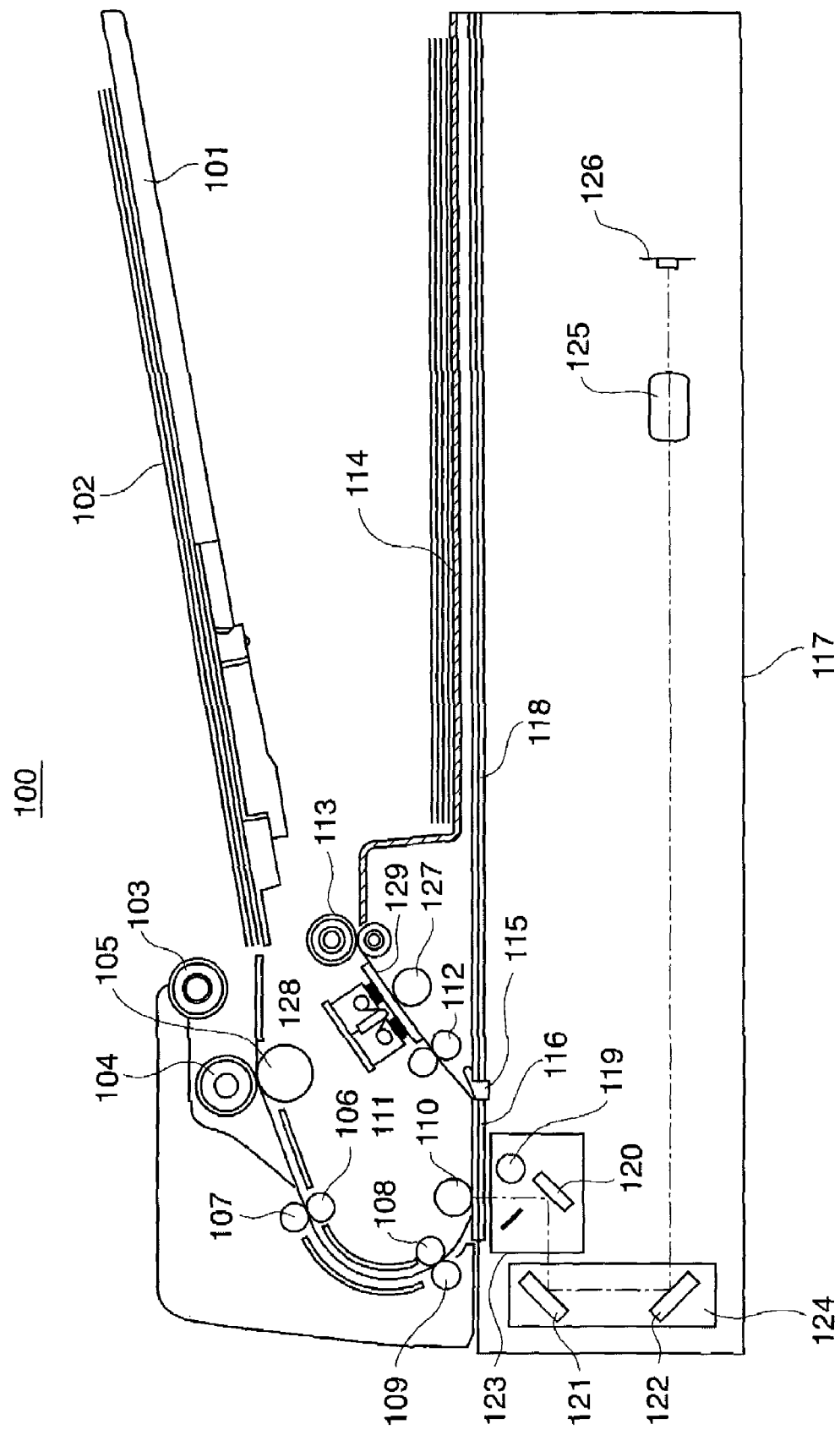
FIG. 1 is a view of an image reading apparatus according to a first embodiment of the present invention.

FIG. 1 is a view of an image reading apparatus according to a first embodiment of the present invention.

As shown in FIG. 1, the image reading apparatus is comprised of an automatic document feeder 100, and an image reading apparatus main unit 117.

Figure 2:
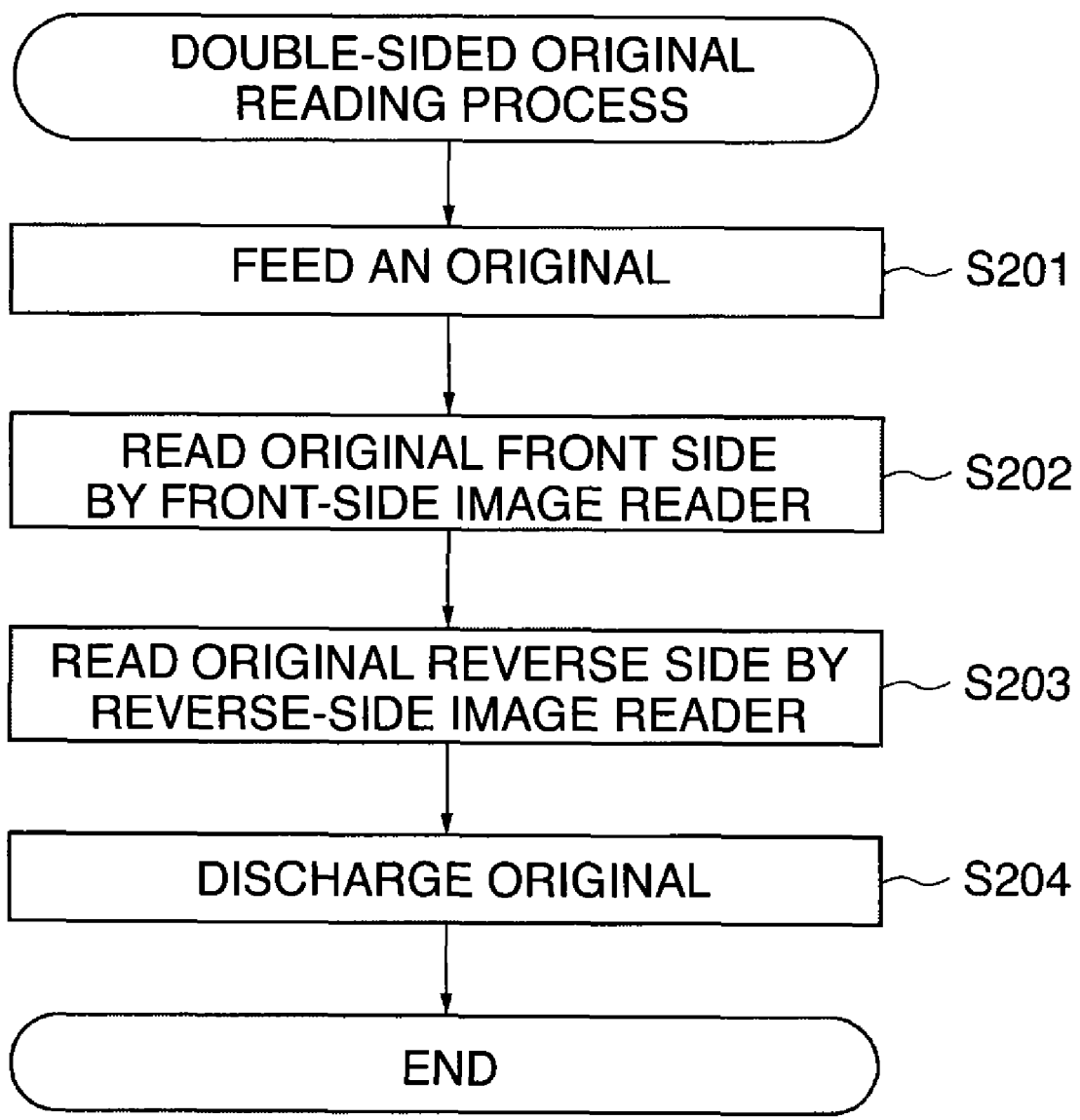
FIG. 2 is a flowchart of a double-sided original reading process executed by the image reading apparatus shown in FIG. 1.

FIG. 2 is a flowchart of a double-sided original reading process executed by the image reading apparatus shown in FIG. 1.

In the following, the arrangement of the image reading apparatus will be described together with operations shown in FIG. 2.

First, originals 102 are stacked on an original tray 101 of the automatic document feeder 100. A sheet feed roller 103 is disposed above the front end of the original tray 101. The sheet feed roller 103 is connected to the same driving power source as a separating and conveying roller 104 is, and rotates along with rotation of the driving power source to feed each original (step S201).

The sheet feed roller 103 is normally in to a retracted home position above the front end of the original tray 101 so as not to interfere with an operation for setting originals thereon. When a sheet-feeding operation is started, the sheet feed roller 103 comes downward into contact with the upper surface of an original 102. The sheet feed roller 103 is pivotally supported on an arm, not shown, and hence the sheet feed roller 103 can be vertically moved along with swinging motion of the arm.

A separating and conveying driven roller 105 is disposed at a location opposed to the separating and conveying roller 104, and is pressed against the same. The separating and conveying driven roller 105 is formed e.g. of a rubber material having a slightly lower friction than the separating and conveying roller 104. The separating and conveying driven roller 105 and the separating and conveying roller 104 cooperate to separate originals 102 fed by the sheet feed roller 103, one from the others, and feed the originals 102 one by one.

A registration roller 106 and a registration driven roller 107 cooperate to align the leading end of an original fed via the separating part (the separating and conveying roller 104 and the separating and conveying driven roller 105), by bringing the leading end of the separated original into abutment against a nip of the registration roller pair at rest, and forming the lead end into a loop, i.e. a curved shape. Then, a lead roller 108 and a lead driven roller 109 cooperate to convey the original toward a moving original reading glass 116. A platen roller 110 is disposed at a location opposed to the moving original reading glass 116.

A CCD line sensor 126 reads image information from the front side of the original 102 passing over the moving original reading glass 116 (first image reader unit) (step S202). When reading of the front-side image of the original 102 by the CCD line sensor 126 is completed, a lead delivery roller 111 and a lead delivery driven roller 112 cooperate to convey the original 102 toward a CIS (Contact Image Sensor) 128.

A jump base 115 is provided for picking up an original 102 from the moving original reading glass 116. A platen roller 127 is disposed at a location opposed to the CIS 128.

The CIS 128 reads image information from the reverse side of the original 102 passing over a moving original reading glass 129 (second image reader unit) (step S203). When reading of the reverse-side image of the original 102 by the CIS 128 is completed, a discharge roller 113 discharges the original 102 onto a discharge tray 114 (step S204).

The image reading apparatus main unit 117 includes a lamp 119 for irradiating light onto a surface of an original 102 to be scanned, and mirrors 120, 121, and 122 for guiding reflected light from the original 102 to a lens 125 and the CCD line sensor 126. The lamp 119 and the mirror 120 are attached to a first mirror base 123. On the other hand, the mirrors 121 and 122 are attached to a second mirror base 124.

The mirror bases 123 and 124 are connected to a drive motor (not shown) by wires (not shown), and are driven by the drive motor to move in parallel with an original platen glass 118. The reflected light from the original 102 is guided to the lens 125 via the mirrors 120, 121, and 122, and is caused to form an image on the light-receiving part of the CCD line sensor 126 by the lens 125. The CCD line sensor 126 photoelectrically converts the reflected light forming the image and outputs an electric signal corresponding to the amount of received light.

Similarly, the CIS 128 photoelectrically converts reflected light from the original 102 by a light-receiving element, and outputs an electric signal corresponding to the amount of received light.

The image reading apparatus main unit 117 constructed as above has a stationary original reading mode for reading an original 102 placed on the original platen glass 118 by moving the first and second mirror bases 123 and 124 in the sub scanning direction (rightward, as viewed in FIG. 1).

Further, the image reading apparatus main unit 117 also has a moving original reading mode for reading an original 102 via the moving original reading glass 116 while conveying the original 102 by the automatic document feeder 100 with the first mirror base 123 and the second mirror base 124 held at rest.

Original reading can be performed in these two modes. In the moving original reading mode, it is also possible to read reverse-side image information of an original 102 by the CIS 128 through the moving original reading glass 129.

Figure 3:
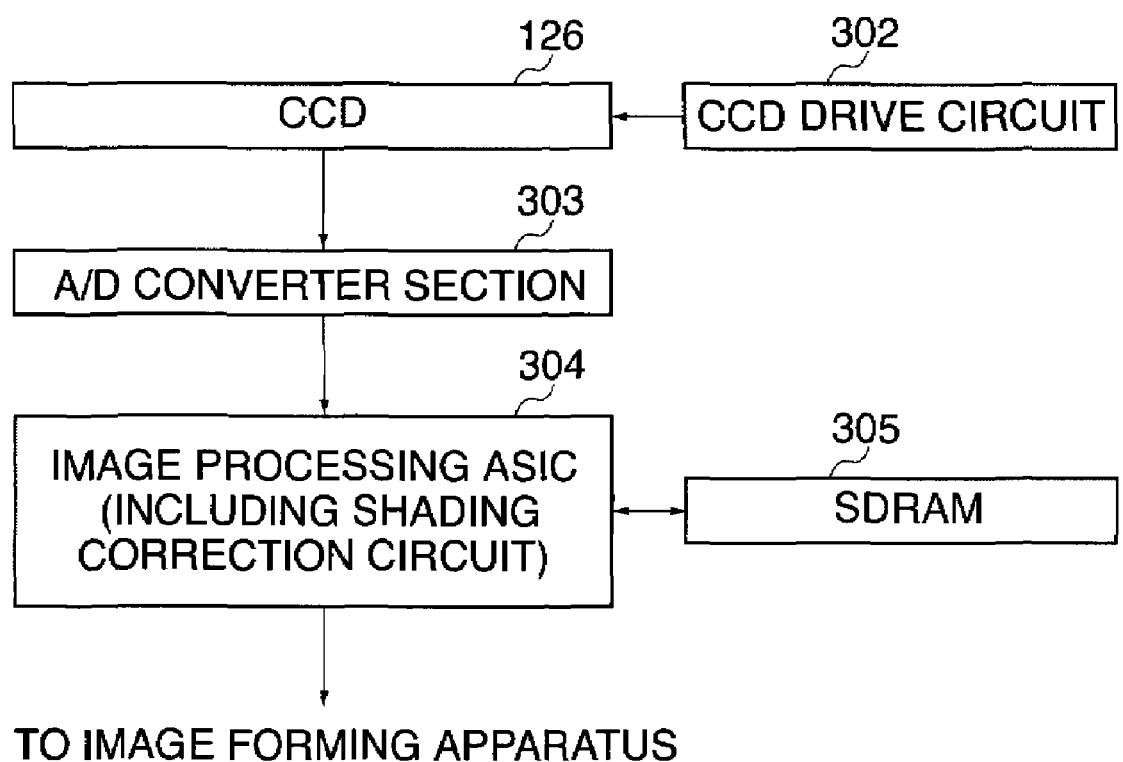
FIG. 3 is a block diagram of essential parts of the image reading apparatus according to the first embodiment.

FIG. 3 is a block diagram of essential parts of the image reading apparatus according to the first embodiment.

Although FIG. 3 shows only a configuration for processing an image signal output from the CCD line sensor 126, an image signal output from the CIS 128 is also processed by the same configuration as this.

As shown in FIG. 3, the image reading apparatus includes a CCD drive circuit 302 that drivingly controls the CCD line sensor 126, and an A/D converter 303 that converts analog data output from the CCD line sensor 126 into digital data. Further, the image reading apparatus includes an image processing ASIC 304 that performs image processing including shading correction on an output signal from the A/D converter 303, and an SDRAM 305 for temporarily storing image data.

Image data subjected to the image processing including the shading correction by the image processing ASIC 304 is delivered to an image forming apparatus, not shown.

Now, a description will be given of the shading correction for correcting variations between pixels of image data output from each of the CCD line sensor 126 and the CIS 128.

First, a shading white sheet is fed by the automatic document feeder 100, and when the shading white sheet is conveyed onto the moving original reading glass 116, the lamp 119 is turned on to illuminate the shading white sheet, and the CCD line sensor 126 reads the shading white sheet to thereby obtain shading data. Next, the CIS 128 reads the shading white sheet by illuminating the same by a light source incorporated in the CIS 128, to thereby obtain shading data just as the CCD line sensor 126 does.

Gain values are adjusted on a pixel-by-pixel basis such that each pixel value of the shading data thus obtained by the CCD line sensor 126 and the CIS 128 becomes equal to an arbitrary target value (e.g. a luminance value of 245). These adjusted gain values are stored as shading correction data.

The shading white sheet is a white sheet having a density thereof uniformly controlled all over its surface, and is different from a reference white plate used for setting a value of data read therefrom by the CCD line sensor 126 to 255. As for the reference white plate, it is desirable to use the same reference white plate for the CCD line sensor 126 that reads a front-side image of an original and the CIS 128 that reads a reverse-side image of an original.

However, the CIS 128 incorporated in the automatic document feeder 100 may not have sufficient inner space for receiving the reference white plate. Therefore, it is desirable to prepare both the reference white plate and the shading white sheet.

Then, offset adjustment is carried out on a pixel-by-pixel basis such that each pixel value (black offset value) of data output from each of the CCD line sensor 126 and the CIS 128 with the associated lamp kept off becomes equal to an arbitrary target value (e.g. a luminance value of 5). These adjusted black offset values are also stored as shading correction data.

Then, the image processing ASIC 304 carries out gain adjustment and offset adjustment on image data output from the CCD line sensor 126 by reading an image of an original, on a pixel-by-pixel basis, based on the stored shading correction data (adjusted gain values and adjusted black offset values), to thereby perform shading correction.

Thus, the shading correction is performed on image data output from each of the CCD line sensor 126 for reading the front-side image of an original and the CIS 128 for reading the reverse-side image of the original.

However, the component elements of the image reading apparatus, i.e. lamps, glasses, lenses, mirrors, and so forth each vary in characteristics due to different manufacturing processes. Further, the respective front-side and reverse-side images of an original are read by different optical systems. Therefore, differences in reading characteristics between reading positions in the main scanning direction remain even after completion of the shading correction, and the differences in reading characteristics are conspicuous between the front-side image reader and the reverse-side image reader.

Therefore, even after the shading correction has been performed as described above, the reading characteristics in the main scanning direction vary to some extent, and further the reading characteristics differ between the front-side image reader and the reverse-side image reader to some extent.

In view of these problems, according to the present embodiment, processing described below is executed so as to reduce variation in the reading characteristics in the main scanning direction.

Figure 4:
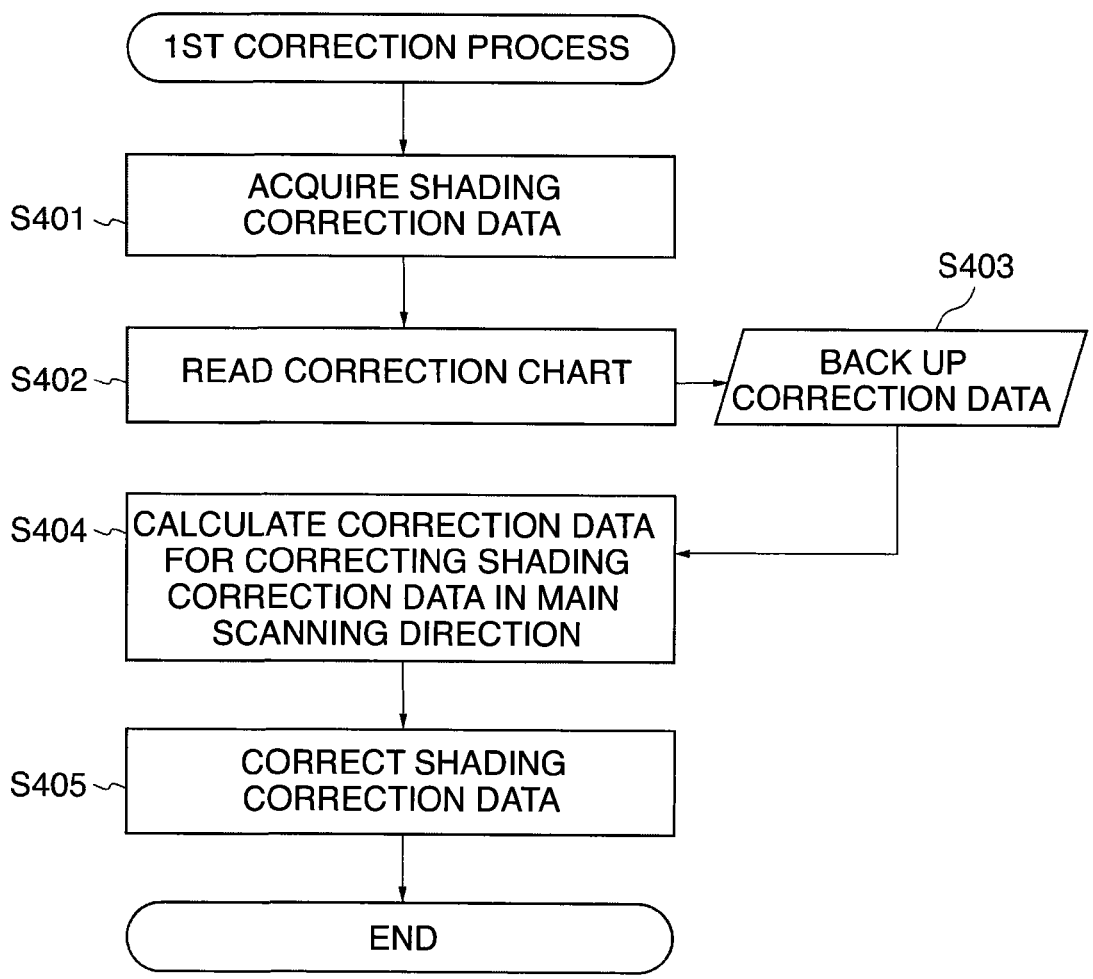
FIG. 4 is a flowchart of a first correction process executed by the image reading apparatus shown in FIG. 3.

FIG. 4 is a flowchart of a first correction process executed by the image reading apparatus shown in FIG. 3.

Referring to FIG. 4, first, shading correction data (adjusted gain values and adjusted black offset values) is acquired by reading the shading white sheet by the CCD line sensor 126 (step S401). Then, a correction chart (reference original), shown in FIG. 5 by way of example, which has a plurality of halftone gradation patches (ten patches in the present example shown in FIG. 5), such as gray scale patches, in each of five regions in the main scanning direction, is read by the CCD line sensor 126 (step S402).

This reference original is not only used for correcting the color differences between the front-side image and the reverse-side images, as will be described in detail as to the second and other following embodiments, but also for correcting the in-surface irregularity (irregularity in one surface of an original) of read luminance, and therefore, patches for the identical density level are required to be uniform in density in respective patch surfaces just as the shading white sheet is. Image-read luminance values (luminance values of read image data) obtained in association with gradation patches for each density level by reading the correction chart are backed up (step S403).

Correction data (black offset correction values and gain correction coefficients) for correcting shading correction data associated with each of the regions in the main scanning direction based on the backed-up luminance values associated with the gradation patches for the respective densities is calculated (step S404). Then, the shading correction data is corrected based on the calculated correction data (step S405). Specifically, the black offset correction values are added to the respective associated adjusted black offset values, and the adjusted gain values are multiplied by the respective associated gain correction coefficients.

Figure 5:
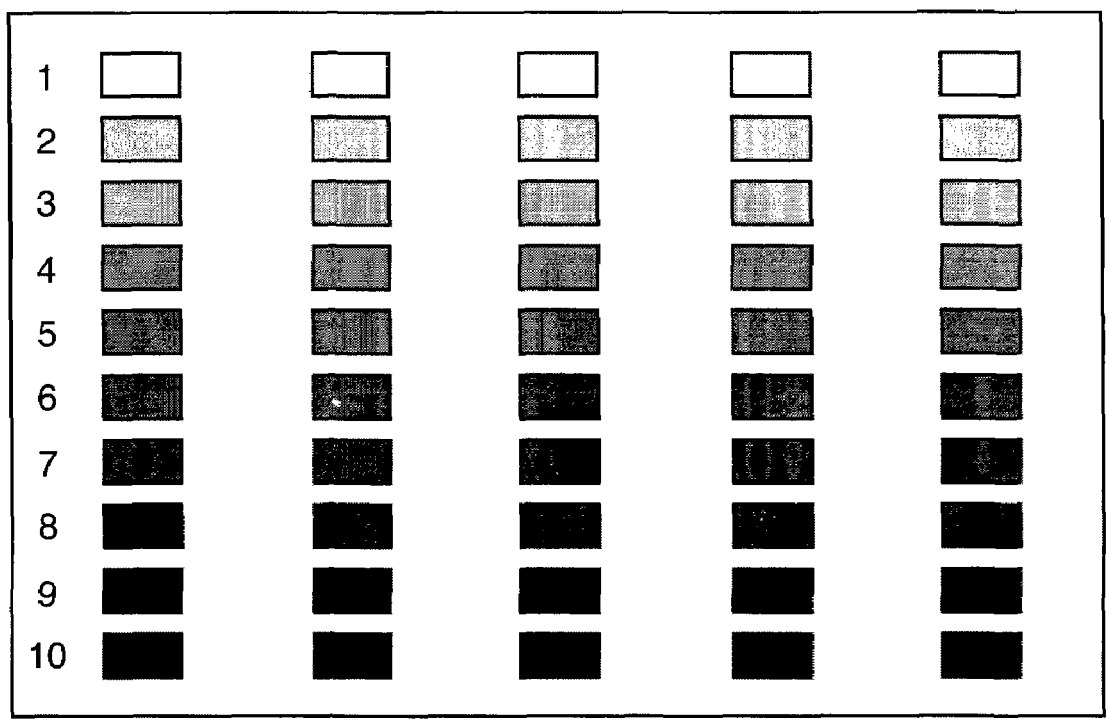
FIG. 5 is a view showing a correction chart.

FIG. 6 is a diagram showing examples of the image-read luminance values associated with the gradation patches for the respective densities, which are obtained in the step S403 in FIG. 4, by reading gradation parts in leftmost, central, and rightmost regions out of the five regions of the correction chart in FIG. 5.

Referring to FIG. 6, "density" indicates a measured density of each patch, and "reflectance" indicates a value defined by the following equation (1):

$$R = \frac{1}{10^D} \Lambda \quad (1)$$

wherein R represents a reflectance, and D represents a density. Further, in FIG. 6, each of the image-read luminance values indicates the average value of luminance values obtained by reading each corresponding patch a plurality of times.

In general, the relationship between the density and the luminance is represented by a density-luminance curve. However, in the present embodiment, the relationship between the reflectance and the luminance is shown in FIG. 7, in place of the relationship between the density and the luminance.

Figure 7:
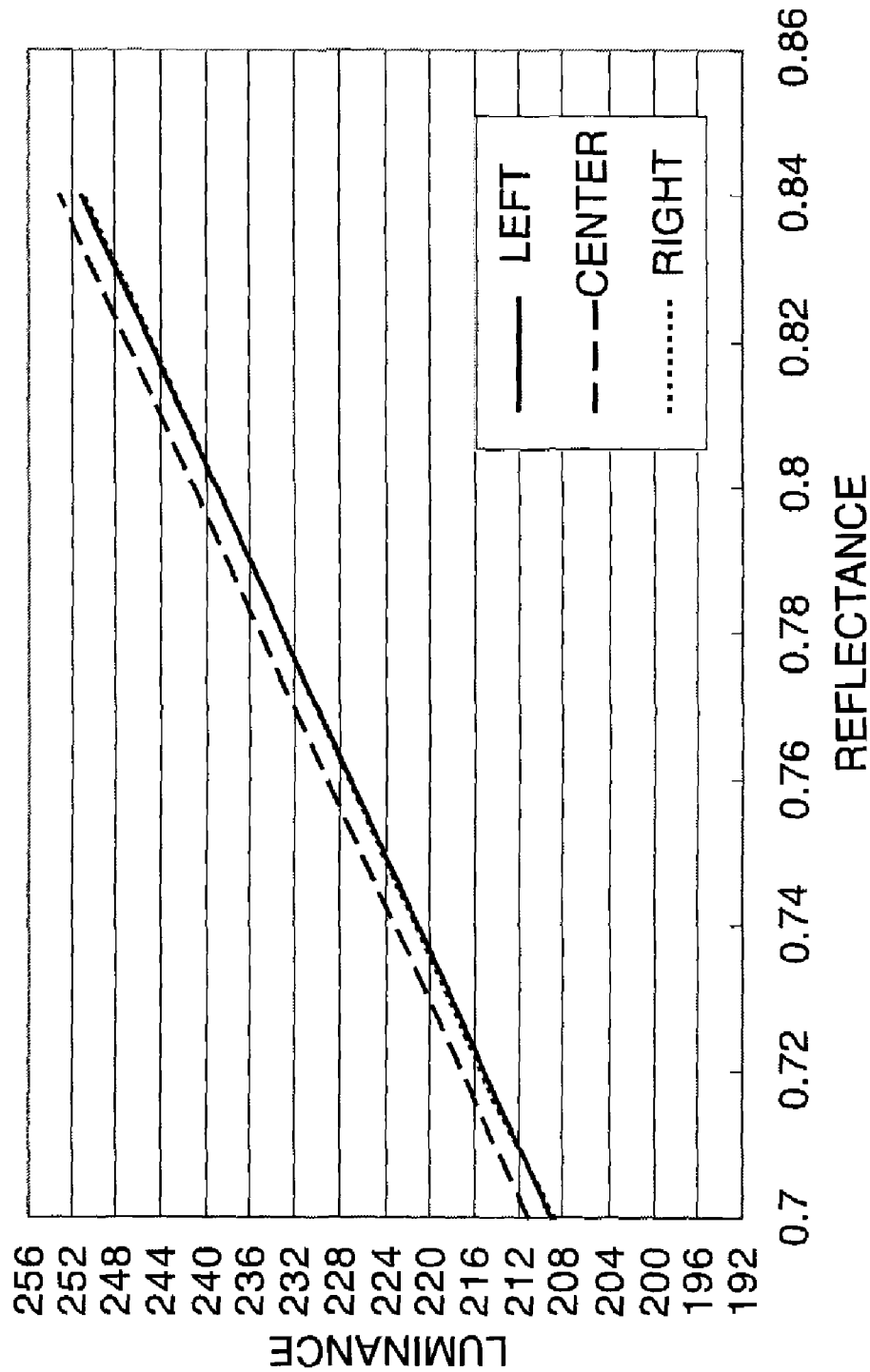
FIG. 7 is a graph showing density linearity characteristics.

FIG. 7 is plotted with the reflectance on the abscissa and the luminance on the ordinate. The reflectance and the luminance are in linear relation as shown in FIG. 7, and this linear relation will be referred to as the density linearity characteristic. Although FIG. 7 shows only the density linearity characteristic of RED color as a representative, GREEN and BLUE have the same tendency as RED.

As shown in FIG. 7, a difference in the density linearity characteristic occurs in the main scanning direction due to an in-surface irregularity of the image-read luminance. This characteristic difference causes color differences (density differences) within one surface, and hence reproducibility of color (density) of an original is degraded.

In the following, a description will be given of a method of reducing the reading characteristic differences (density linearity characteristic differences) in the main scanning direction.

The difference in the reading characteristics in reading the CCD-side surface in the main scanning direction can be reduced using all associated data of the measured data backed up in the step S403 in FIG. 4. In this case, however, it is required to refer to a lookup table (LUT) or the like, which causes an increase in the circuit size. Further, a massive amount of reference backup data is required, and hence it may be difficult to realize reduction of the difference in the reading characteristics in the main scanning direction with limited memory resources.

In view of these problems, according to the present embodiment, the reading characteristic differences in the main scanning direction are reduced using only two patches, i.e. only one patch on the lower-density side and one patch on the higher-density side of the halftone gradation patches in each of the aforementioned three regions, i.e. the leftmost, central, and rightmost regions in the main scanning direction. In the present embodiment, data for patches with a density of 0.15 and patches with a density of 1.79 are selected from the example shown in FIG. 6.

The read luminance data, which was backed up in the step S403, of each of the halftone gradation patches having a density of 0.15 and a density of 1.79, respectively, is read out for each of the selected regions in the main scanning direction of the CCD line sensor 126. Then, black offset correction values and gain correction coefficients are calculated for the respective R,G, and B colors on a region-by-region basis. For example, in the case of calculating black offset correction values and gain correction coefficients for read luminance values (data) of the leftmost patches to be corrected e.g. with reference to the read luminance values (data) of the respective high-density and low-density patches in the central region, assuming that the luminance values are represented by respective symbols as shown in Table 1,

TABLE 1

| | READ LUMINANCE OF HIGH-DENSITY PATCH | READ LUMINANCE OF LOW-DENSITY PATCH |
|---|---|---|
| LEFT | X1 | X2 |
| CENTER | Y1 | Y2 | a gain correction coefficient "a" and a black offset correction value "b" can be determined by the following equations:

$$a = \frac{x_2 - x_1}{y_2 - y_1} \Lambda \quad (2)$$

$$b = x_2 - a y_2 \Lambda \quad (3)$$

The shading correction data is corrected using the correction data (black offset correction values and gain correction coefficients) (step S405). FIG. 8 shows values of the respective luminance differences of the R, G, and B colors each detected of each of the ten gradation patches in each region where the read luminance difference value of the corresponding color on the corresponding patch is larger than in any other region, for comparison between values before correction of the read luminance differences in the main scanning direction, and after the correction.

As is understood from FIG. 8, by correcting the shading correction data using the correction data (black offset correction values and gain correction coefficients) (step S405), the read value differences are reduced to such an extent that the luminance difference, which was at a value of 2 at the maximum, has been reduced, i.e. improved to lower than 1 after the correction. In short, it is possible to perform matching the reading characteristics in the main scanning direction in a wide density range from the high-density portion to the low-density portion.

As described above, it is possible to easily reduce reading characteristic differences in the main scanning direction by reading only two of the gray gradation patches configured to be read at predetermined locations in the main scanning direction. As a consequence, color differences or density differences in the main scanning direction can be reduced.

Next, a second embodiment of the present invention will be described with reference to FIGS. 9 to 14. The second embodiment is distinguished from the first embodiment in which the method of reducing read luminance differences in the main scanning direction is described, only in that a method of reducing the read luminance difference between the front side and the reverse side, i.e. a method of matching between the fronts-side reading characteristics and the reverse-side reading characteristics is described. Therefore, in the present embodiment, component parts and elements corresponding to those of the first embodiment are designated by identical reference numerals, and detailed description thereof is omitted.

Figure 9:
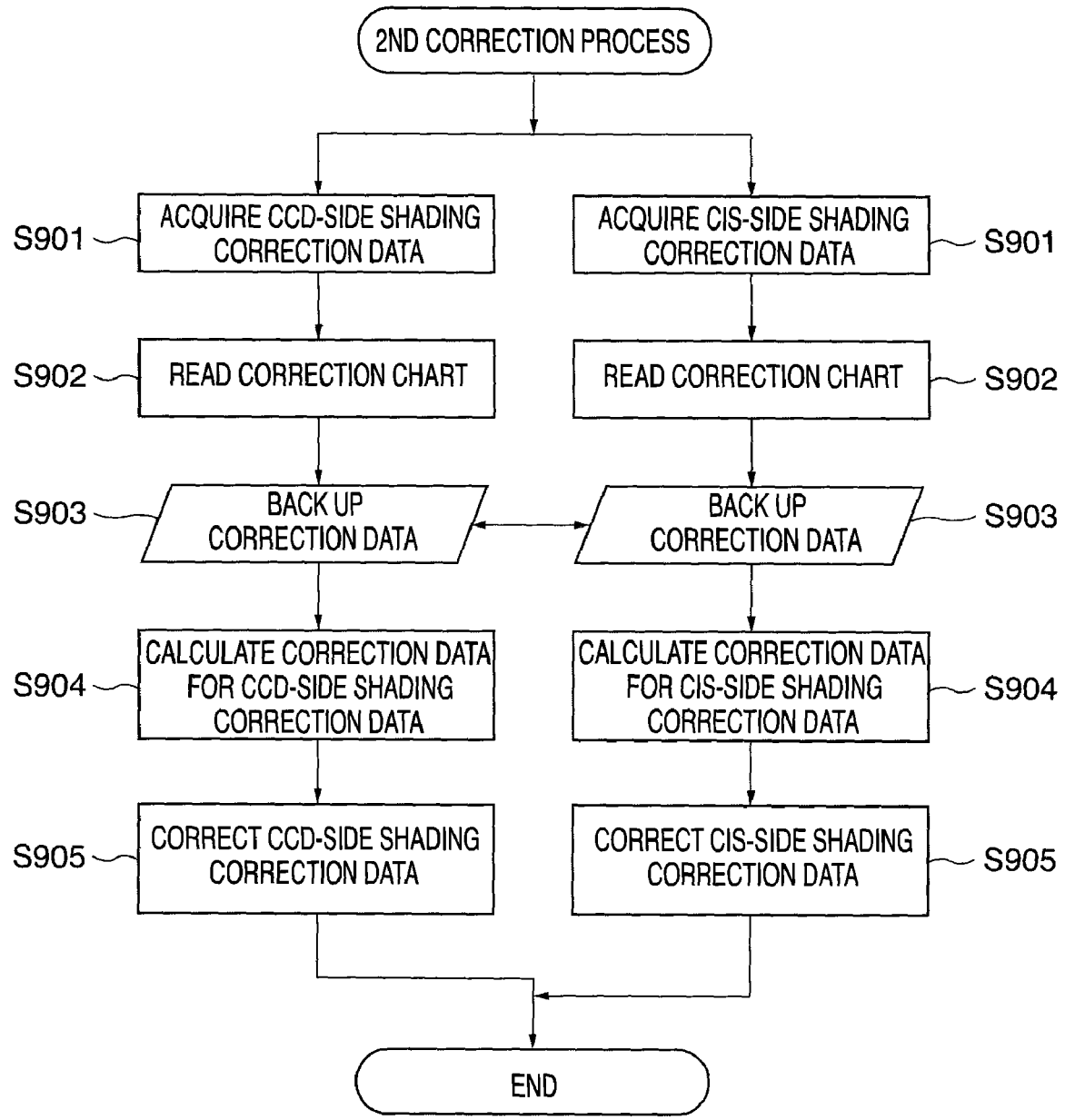
FIG. 9 is a flowchart of a second correction process executed by the image reading apparatus shown in FIG. 3.

FIG. 9 is a flowchart of a second correction process executed by the image reading apparatus shown in FIG. 3.

Referring to FIG. 9, first, the shading white sheet is read by the CCD line sensor 126 and the CIS 128 to thereby acquire shading correction data (step S901).

Then, a correction chart (reference original), shown in FIG. 5 by way of example, which has front and reverse surfaces each printed with an identical set of a plurality of halftone gradation patches, such as gray scale patches, is read by the CCD line sensor 126 and the CIS 128 (step S902). This reference original also plays the role of correcting the in-surface irregularity of read luminance, and therefore, patches for the identical density level are required to be uniform in density in respective patch surfaces just as the shading white sheet is.

Image-read luminance values obtained by reading the gradation patches for respective densities for the CCD side and the CIS side are backed up (step S903). It should be noted that in FIG. 9, the steps S903 for the respective CCD and CIS sides are linked to each other, so as to indicate that the reduction of the luminance difference described in the following steps is carried out based on the mutual relationship in the image-read luminance value between the front and reverse sides (the CCD and CIS sides). That is, correction data (black offset correction values and gain correction coefficients) for correcting shading correction data for the respective CCD and CIS sides are calculated based on the backed-up luminance values associated with the gradation patches for the respective densities (step S904) More specifically, as will be described in further detail hereinafter, in the present embodiment, the correction data (black offset correction values and gain correction coefficients) are calculated using the read luminance values of only two patches, i.e. only one patch on the lower-density side and one patch on the higher-density side of the halftone gradation patches in each region, with the read luminance values obtained from the corresponding patches of the corresponding region of the front side as the references, by the aforementioned equations (2) and (3). Then, the shading correction data associated with the respective CCD and CIS sides are corrected based on the calculated correction data (step S905), followed by terminating the present process.

FIG. 10 is a diagram showing examples of the image-read luminance values obtained in association with the gradation patches for respective densities by reading the correction chart.

In FIG. 10, the read luminance values associated with the respective gradation patches in the center of the chart shown in FIG. 5 are shown as representatives. In actuality, it is required to execute a method described below in each of the regions on the front side and the reverse side. However, since the same processing is carried out for each of the regions, description of the processing executed for the other regions than the central region is omitted for simplicity.

Figure 11:
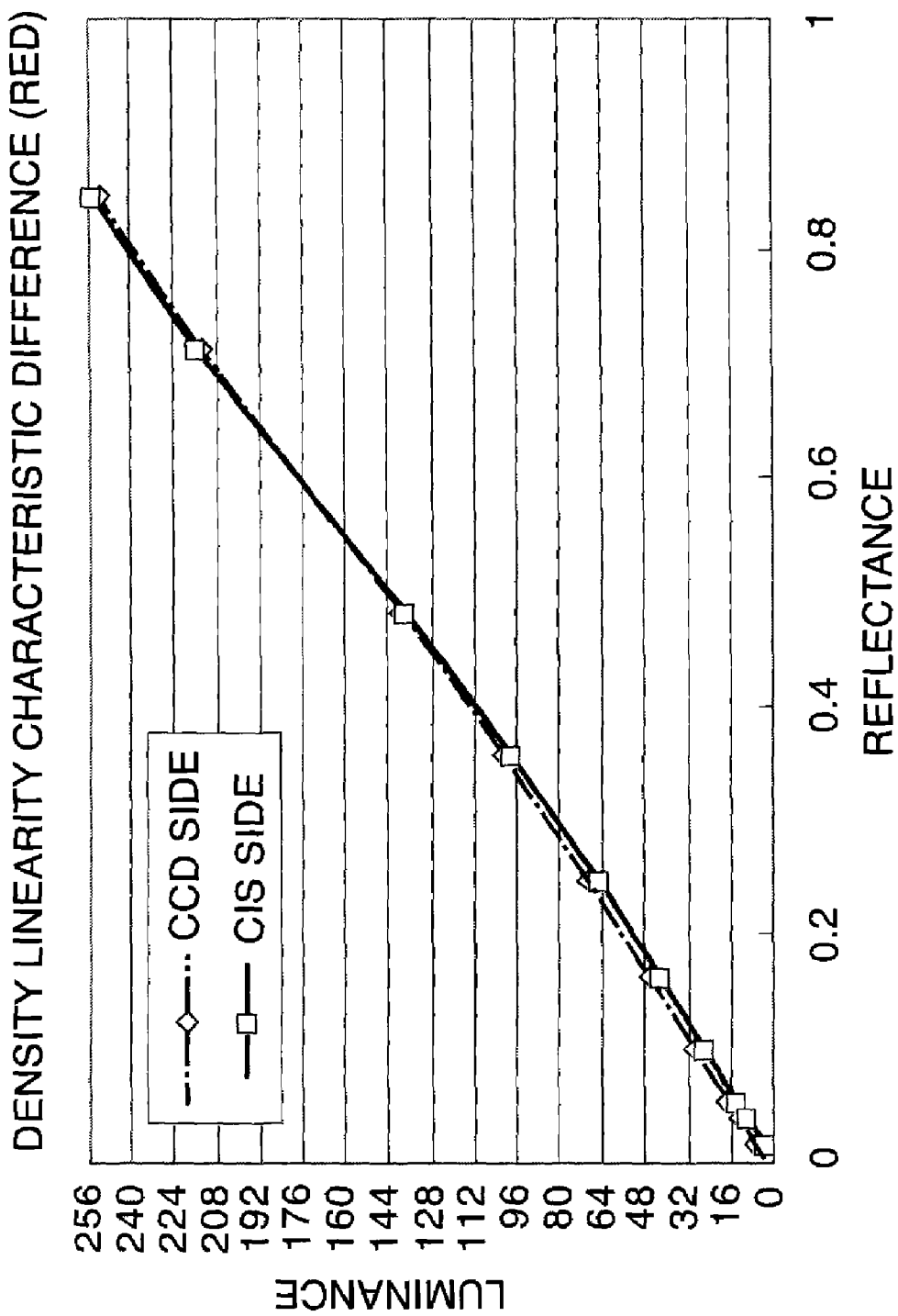
FIG. 11 is a graph showing a front-side density linearity characteristic and a reverse-side density linearity characteristic, for comparison.

FIG. 11 shows only the density linearity characteristic difference associated with RED color as a representative, since GREEN color and BLUE color have the same tendency as RED color. Further, each of the image-read luminance values indicates the average value of luminance values obtained by reading each corresponding patch a plurality of times.

As shown in FIG. 11, a difference occurs in the density linearity characteristic between the front side and the reverse side, and this difference is due to a difference between front-side reading characteristics and reverse-side reading characteristics. In the following, a description will be given of a method of reducing the difference between the front-side reading characteristics and the reverse-side reading characteristics.

The read luminance values of the respective patches may be caused to match between the CCD side and the CIS side, using all the measured data backed up in the step S903 in FIG. 9. In this case, however, it is required to refer to a lookup table (LUT) or the like, which causes an increase in the circuit size. Further, a massive amount of reference backup data is required, and hence it may be difficult to realize reduction of the difference in the reading characteristics with limited memory resources.

In view of these problems, according to the present embodiment, matching of the read luminance values between the front side and the reverse-side, i.e. matching between the front-side reading characteristics and the reverse-side reading characteristics is performed using only two patches, i.e. one patch on the low-density side and one patch on the high-density side, of the halftone gradation patches in each of the regions of the correction chart (reference original) read by the CCD line sensor 126 and the CIS 128, with the data (read luminance values) obtained for the CCD line sensor 126 (front side) as the references. In the present embodiment, a patch with a density of 0.15 and one with a density of 1.79 are selected from the example shown in FIG. 10.

Figure 12:
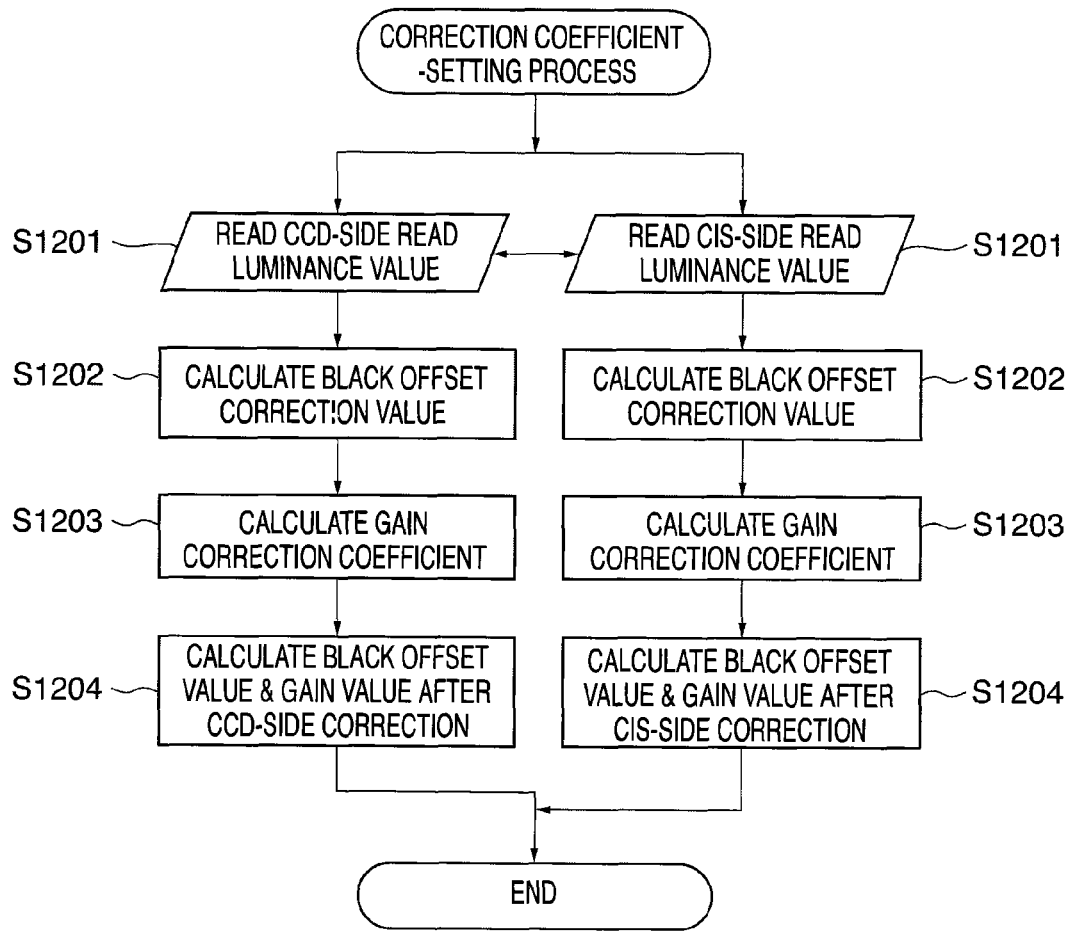
FIG. 12 is a flowchart of a correction coefficient-calculating process executed in steps S904 and S905 in FIG. 9.

FIG. 12 is a flowchart of a correction coefficient-calculating process executed in the steps S904 and S905 in FIG. 9.

Referring to FIG. 12, first, read luminance values associated with the halftone gradation patches having a density of 0.15 and a density of 1.79, respectively, are read out from the CCD-side read luminance data and the CIS-side luminance data backed up in the step S903 (step S1201).

Then, a black offset correction value and a gain correction coefficient are calculated for each of the R, G, and B colors and for each region (steps S1202 and S1203). The calculations are performed using the equations (2) and (3). In this case, CCD-side read luminance data (read luminance values of the front side) are used as the reference (i.e. Y1 and Y2 in the equations), for example. Further, correction is carried out on specific values of shading correction data (step S1204). As a consequence, values shown in FIG. 13 are obtained. Then, the present process is terminated.

FIG. 14 shows differences between the CCD-side read values and the CIS-side read values, for comparison between the differences before and after the correction. As is understood from FIG. 14, by correcting the shading correction data, the read value differences are reduced to such an extent that the difference, which was around a value of 8 at the maximum before the correction, has been improved to around a value of 3 at the maximum after the correction. In short, simply by applying the method of reducing the read luminance differences, which is applied to the main scanning direction in the first embodiment, to between the CCD side and the CIS side (the front and reverse sides), it is possible to perform matching between the front-side reading characteristics and the reverse-side reading characteristics in a wide density range from the highest-density portion to the lowest-density portion.

As described above, it is possible to easily reduce differences between the front-side reading characteristics and the reverse-side reading characteristics by reading only two of the gray gradation patches in each region. As a consequence, color differences (density differences) between the front side and the reverse side can also be reduced.

It should be noted that in the above-described first and second embodiments, a reduction optical system using the CCD line sensor 126 for reading a front-side original image and an unity magnification optical system using the CIS 128 for reading a reverse-side original image are employed.

Reversely to the configuration of the first and second embodiments, an unity magnification optical system using the CIS 128 for reading a front-side original image and a reduction optical system using the CCD line sensor 126 for reading a reverse-side original image may be employed.

Next, a third embodiment will be described with reference to FIGS. 15 to 17. In the present embodiment, a description will be given of matching of in-surface reading characteristics and front-side and reverse-side reading characteristics in a case where two patches are selected from each of the low-density portion and the high-density portion, i.e. in a case where four patches are selected. More specifically, the description will be given of a case where a patch with a density of 0.15 and a patch with a density of 0.45 are selected from the low-density portion, and a patch with a density of 1.00 and a patch with a density of 1.79 from the high-density portion, for matching over in-surface reading characteristics and between the front-side reading characteristics and the reverse-side reading characteristics.

Figure 15:
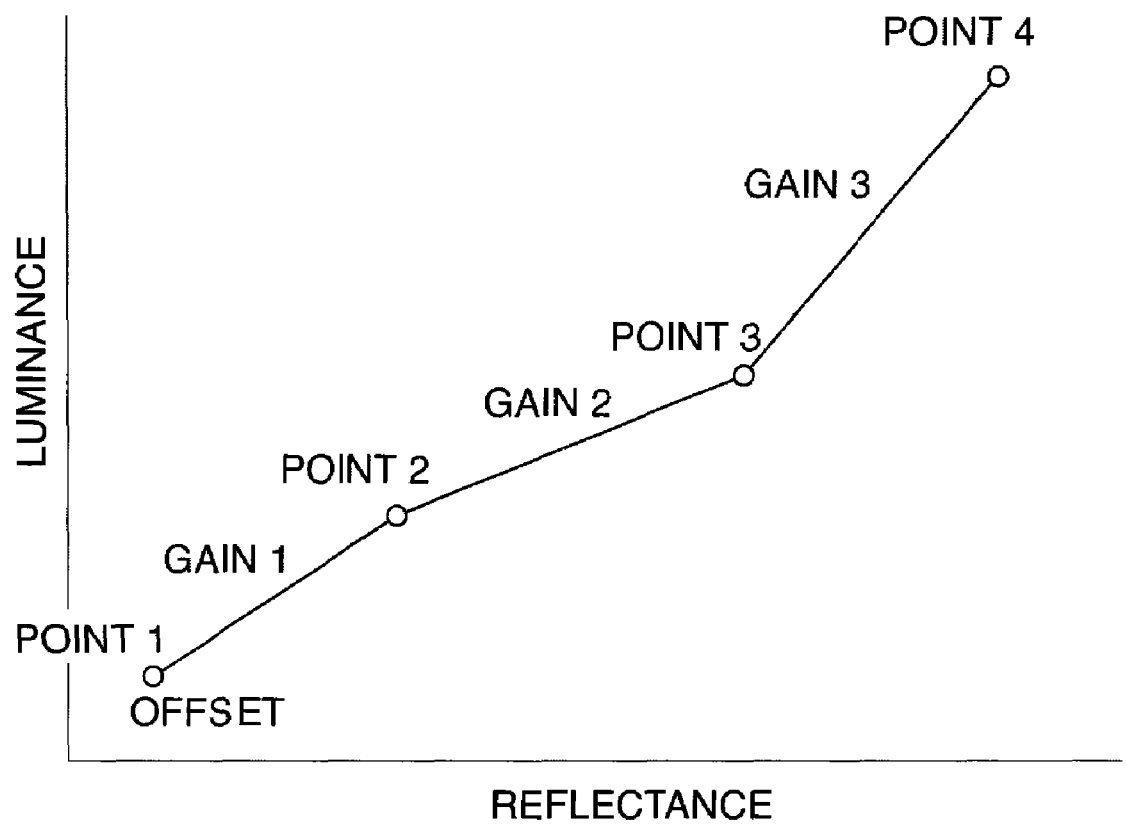
FIG. 15 is a conceptual view of four-point correction of a density linearity characteristic.

FIG. 15 is a conceptual view of four-point correction of the density linearity characteristic.

As is understood from FIG. 15, in the case of correcting the density linearity characteristic at four points, it is required to set one black level offset value and three gain values. That is, in the case of correcting the density linearity characteristic at n points (n: an integer not less than 2), it is required to set one black level offset value and n−1 gain values.

When luminance values associated with the four points are represented as shown in Table 2, a gain correction coefficient a1 between POINT 1 and POINT 2, a gain correction coefficient a2 between POINT 2 and POINT 3, a gain correction coefficient a3 between POINT 3 and POINT 4, and an offset correction value b for matching between front-side reading characteristics and the reverse-side reading characteristics can be obtained by the following equations (4) to (6):

TABLE 2

| | LUMINANCE OF POINT 1 | LUMINANCE OF POINT 2 | LUMINANCE OF POINT 3 | LUMINANCE OF POINT 4 |
|---|---|---|---|---|
| CCD SIDE | X1 | X2 | X3 | X4 |
| CIS SIDE | Y1 | Y2 | Y3 | Y4 |

$$a_1 = \frac{x_2 - x_1}{y_2 - y_1} \Lambda \quad (4)$$

$$b = x_2 - a_1 y_2 \Lambda \quad (5)$$

TABLE 2-continued

| LUMINANCE OF POINT 1 | LUMINANCE OF POINT 2 | LUMINANCE OF POINT 3 | LUMINANCE OF POINT 4 |
|---|---|---|---|

$$a_i = \frac{x_{i+1}}{y_{i+1}} (i = 2, 3) \wedge \quad (6)$$

It should be noted that the calculations are sequentially carried out from a range between POINT 1 and POINT 2 to a range between POINT 3 and POINT 4.

FIG. 16 shows results of corrections performed on the respective values shown in FIG. 10 by way of example. Further, FIG. 17 shows differences between the CCD-side read values and the respective associated CIS-side read values, for comparison between the differences before and after the correction according to the present embodiment.

As is understood from FIG. 17, by carrying out the four-point correction, the differences between the read luminance values have been reduced to such an extent that the difference, which was around a value of 8 at the maximum before the correction, has been improved to a value of 3 at the maximum after the correction.

Although in the above-described embodiment, the description is given of the case where color reading is performed, quite the same method can also be employed for monochrome reading to reduce the difference between the front-side reading characteristics and the reverse-side reading characteristics, thereby reducing the density difference between the front side and the reverse side when printing an original for copying.

Next, a fourth embodiment will be described with reference to FIGS. 18 and 19.

In the above-described first to third embodiments, the method of matching the reading characteristics in the main scanning direction or between the front-side and reverse-side reading characteristics was described in detail.

Actually, however, even patches with the same density can cause large differences in the reading characteristics depending on the conditions of an original surface, i.e. depending on whether the original surface is glossy and "slippery" or non-glossy and "rough".

Figure 18A:
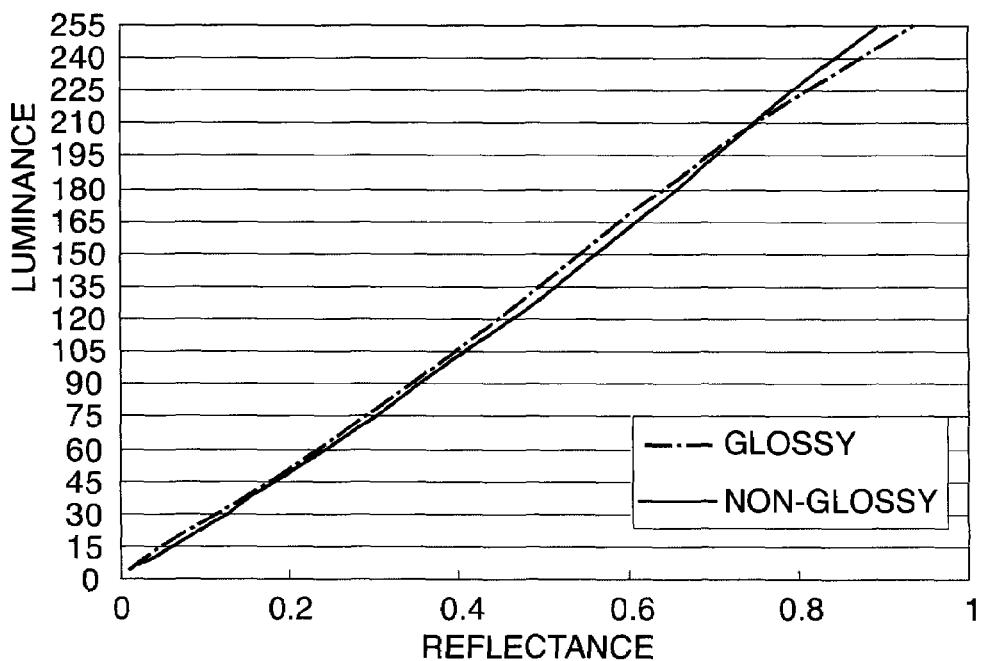
FIGS. 18A and 18B are diagrams showing a density linearity characteristic in a case where an original has gloss and a density linearity characteristic in a case where an original has no gloss.
Figure 18B:
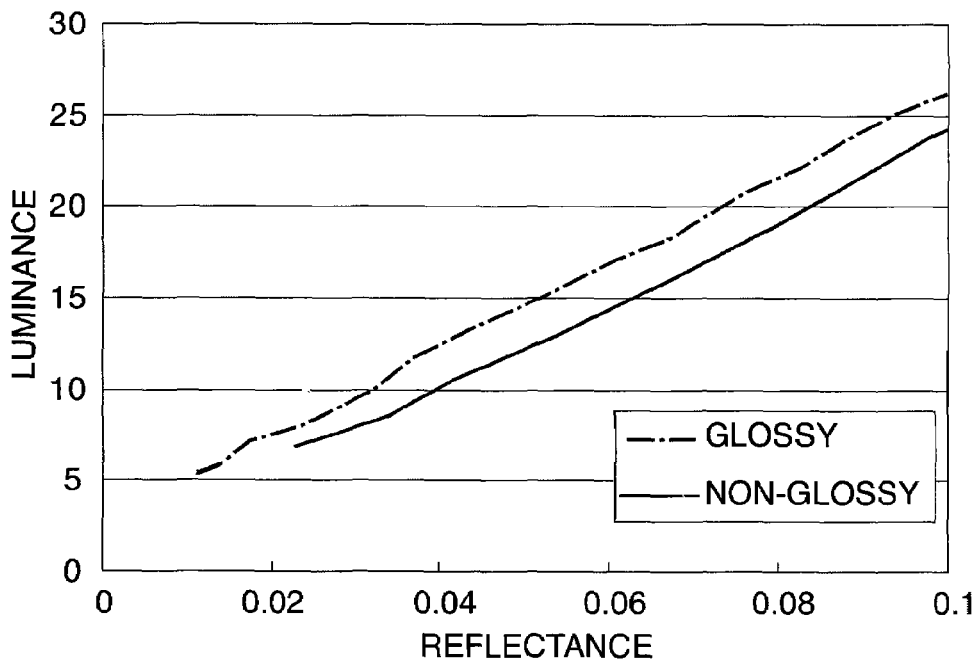

FIGS. 18A and 18B are diagrams showing a density linearity characteristic in a case where an original has gloss and a density linearity characteristic in a case where an original has no gloss.

FIG. 18A shows the density linearity characteristics in the whole density range, and FIG. 18B shows the high density range thereof on an enlarged scale. As is understood from FIGS. 18A and 18B, the density linearity characteristic significantly differs depending on the property of an original surface.

Therefore, in the case of performing matching between the front-side reading characteristic and the reverse-side reading characteristic, as described as to the second embodiment, if the black offset values and the gain values are corrected according to the property of an original surface to be read, it is possible to achieve more accurate matching of the reading characteristics.

Figure 19:
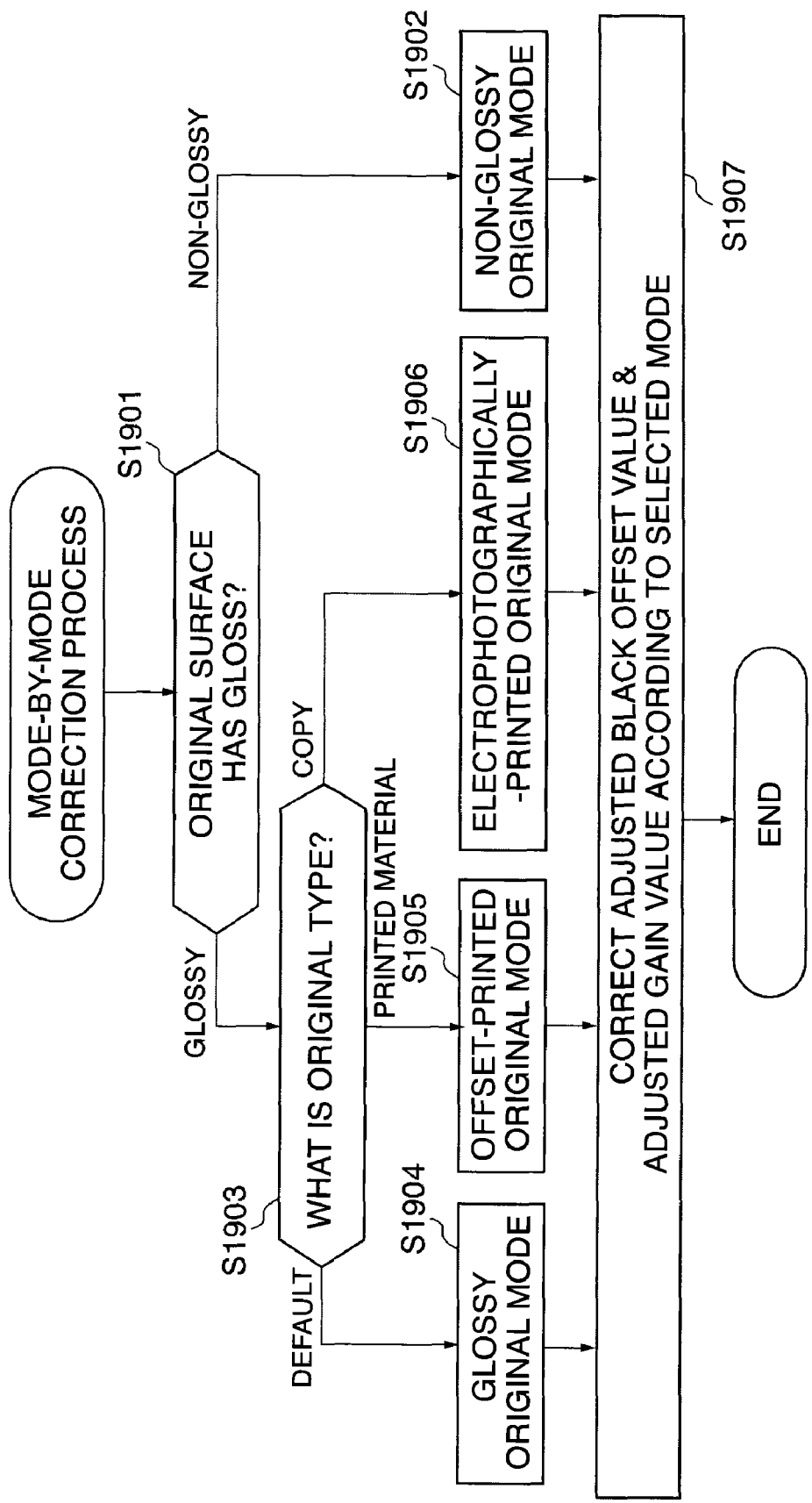
FIG. 19 is a flowchart of a mode-by-mode correction process executed by the image reading apparatus shown in FIG. 3.

FIG. 19 is a flowchart of a mode-by-mode correction process executed by the image reading apparatus shown in FIG. 3.

Specifically, according to the flowchart shown in FIG. 19, a user selects the property of an original to be read on a user interface screen, and a reading mode is set based on the selected property of the original, whereafter a correction process according to the mode is executed.

In the present embodiment, there is shown a case where the property of an original can be selected from four types of original surface property, i.e. not only based on whether or not the original has gloss, but also based on whether the original is offset-printed or electrophotographically output. Further, a mechanism may be provided which enables the adjusted black offset values and the adjusted gain values to be changed as desired.

Referring to FIG. 19, first, the surface property of the original is determined (step S1901). If the original is not glossy, a non-glossy original mode is selected (step S1902), whereas if the original is glossy, the type of the original is determined (step S1903). Then, one of a glossy original mode, an offset-printed original mode, and an electrophotographically-printed original mode is selectively set according to the determined original type (step S1904, S1905, or S1906). Finally, an adjusted black offset value-correcting process and an adjusted gain value-correcting process are executed based on the set mode (step S1907), followed by terminating the present process.

Next, a fifth embodiment will be described with reference to FIG. 20.

In the above-described first to third embodiments, the optical system including an image sensor for front-side image reading and the optical system including an image sensor for reverse-side image reading are different, i.e. the former is one of the two types of the reduction optical system and the unity magnification optical system, and the latter is the other.

In the present embodiment, a description will be given of a case where the optical system for front-side image reading and the optical system for reverse-side image reading are of the same type, for example, a case where reduction optical systems including respective two CCD line sensors are used as a front-side reader and a reverse-side reader, respectively.

Since the component elements of an image reading apparatus, i.e. lamps, glasses, lenses, mirrors, and so forth each vary in characteristics due to difference in the manufacturing process, even when the reading optical systems of the same type are used for original front-side reading and original reverse-side reading, the reading characteristics slightly differ between the front-side image reader and the reverse-side image reader.

Figure 20:
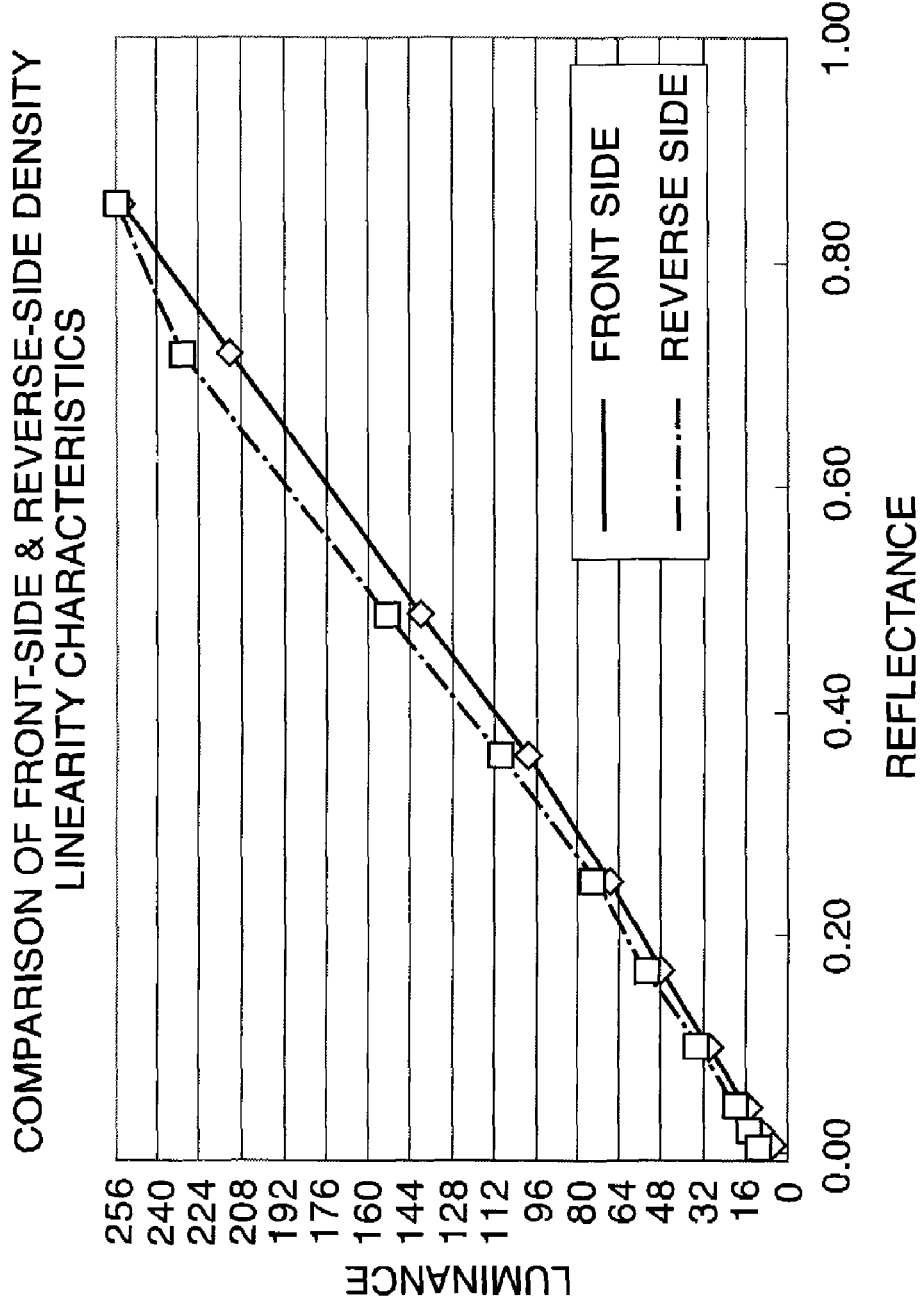
FIG. 20 is a diagram showing a front-side density linearity characteristic and a reverse-side density linearity characteristic in a case where a front-side image reader and a reverse-side image reader are of the same type.

FIG. 20 is a diagram showing comparison between a front-side density linearity characteristic and a reverse-side density linearity characteristic in a case where the reduction optical systems including the respective two CCD line sensors are used for the front-side reading and reverse-side reading, respectively.

As is understood from FIG. 20, even when the identical optical systems of the same type are used for the front-side reading and reverse-side reading, respectively, the front-side reading characteristics and the reverse-side reading characteristics are slightly different from each other. Further, even if front and reverse sides of an original has the same surface property, the front-side reading characteristics and the reverse-side reading characteristics slightly differ from each other due to difference between scanning on the original platen glass 118 and moving original scanning by the automatic document feeder 100. However, by executing the processing for matching between the front-side reading characteristics and the reverse-side reading characteristics, described in the above embodiments, it is possible to reduce, i.e. correct the reading characteristic differences between the front side and the reverse side.

Thus, in correction of the front-side reading characteristics and the reverse-side reading characteristics in the above-described embodiments, even when a reading mode for front-side reading and a reading mode for reverse-side reading are different from each other, or whether front-side reading and reverse-side reading are performed by the image readers of the same type or by respective different types of image readers, it is possible to match the front-side and reverse-side reading characteristics with high accuracy. Further, only a simple configuration is required for the matching.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-253208 filed Sep. 19, 2006. which is hereby incorporated by reference herein in its entirety.

What is claimed is:

1. An image reading apparatus comprising:
a reader unit configured to read an original image; and
a correction unit configured to perform correction on original image data read from the original image by said reader unit,
wherein said correction unit performs a shading correction on original image data read from the original image by said reader unit by correcting shading correction data for shading correction based on read data obtained by reading a reference original having at least two different density patches, the shading correction data comprising an adjusted gain value and an adjusted black offset value calculated for each pixel, and
wherein said correction unit calculates a gain correction coefficient by which the adjusted gain value is to be multiplied and a black offset correction value to be added to the adjusted black offset value.

2. An image reading apparatus, comprising:
a reader unit configured to read an original image; and
a correction unit configured to perform correction on original image data read from the original image by said reader unit,
wherein said reader unit includes a first reader unit configured to read a front-side image of an original, and a second reader unit configured to read a reverse-side image of the original,
wherein said correction unit performs shading correction on respective first and second original image data read from the original image by said first and second reader units, respectively, by correcting first and second shading correction data for shading correction based on read data obtained by reading a reference original having at least two different density patches by said first and second reader unit, and
wherein the shading correction data comprises an adjusted gain value and an adjusted black offset value calculated for each pixel, and said correction unit calculates a gain correction coefficient by which the adjusted gain value is to be multiplied and a black offset correction value to be added to the adjusted black offset value.

3. An image reading apparatus comprising:
a reader unit configured to read an original image; and
a correction unit configured to perform correction on original image data read from the original image by said reader unit,
wherein said correction unit corrects a gain and an offset in the original reflectance-read luminance characteristic of said reader unit, on a color component-by-color component basis, based on image data read by said reader unit from a reference original having at least two different density patches, such that differences in the original reflectance-read luminance characteristic in a main scanning direction of said reader unit are reduced.

4. An image reading apparatus as claimed in claim 3, wherein the reference original comprises at least two gradation images different in reflectance, and said correction unit performs linear approximation of the original reflectance-read luminance characteristic of said reader unit, based on image data of two different gradation images read by said reader unit.

5. An image reading apparatus comprising:
a reader unit configured to read an original image; and
a correction unit configured to perform correction on original image data read from the original image by said reader unit,
wherein said reader unit includes a first reader unit configured to read one side of an original and a second reader unit configured to read the other side of the original,
wherein said correction unit corrects a gain and an offset in the original reflectance-read luminance characteristic of each of said first and second reader units, on a color component-by-color component basis, based on image data read by said first and second reader units from a reference original having at least two different density patches.

6. An image reading apparatus as claimed in claim 5, wherein the reference original comprises at least two gradation images different in reflectance, and said correction unit performs linear approximation of the original reflectance-read luminance characteristics of said respective first and second reader units, based on image data of two different gradation images read by each of said first and second reader units.

7. A method of reading an original image using an image reading apparatus having a reader unit and a correction unit, the method comprising:
a reading step of reading an original image with the reader unit; and
a correction step of performing correction on original image data read from the original image in the reading step by,
wherein the correction step includes a step of shading correcting original image data read from the original image in the reading step by correcting shading correction data for shading correction based on read data obtained by reading a reference original having at least two different density patches, the shading correction data comprising an adjusted gain value and an adjusted black offset value calculated for each pixel, and
a step of calculating a gain correction coefficient by which the adjusted gain value is to be multiplied and a black offset correction value to be added to the adjusted black offset value.

8. A method of reading an original image using an image reading apparatus having a reader unit comprising a first reader unit configured to read a front-side image of an original and a second reader unit configured to read a reverse-side image of the original, and a correction unit, the method comprising:
a reading step of reading an original image with the reader unit; and
a correction step of performing correction on original image data read from the original image in the reading step,
wherein the correction step includes a step of shading correcting respective first and second original image data read from the original image by the first and second reader units, respectively, by correcting first and second shading correction data for shading correction based on read data obtained by reading a reference original having at least two different density patches with the first and second reader unit, the shading correction data comprising an adjusted gain value and an adjusted black offset value calculated for each pixel, and a step of calculating a gain correction coefficient by which the adjusted gain value is to be multiplied and a black offset correction value to be added to the adjusted black offset value.

9. A method of reading an original image using an image reading apparatus having a reader unit and a correction unit, the method comprising:

a reading step of reading an original image with the reader unit; and a correction step of performing correction on original image data read from the original image in the reading step by:

wherein the correction step includes a step of correcting a gain and an offset in the original reflectance-read luminance characteristic of the reader unit, on a color component-by-color component basis, based on image data read by the reader unit from a reference original having at least two different density patches, such that differences in the original reflectance-read luminance characteristic in a main scanning direction of the reader unit are reduced.

10. A method of reading an original image using an image reading apparatus having a reader unit comprising a first reader unit configured to read one side of an original and a second reader unit configured to read the other side of the original, and a correction unit, the method comprising:

a reading step of reading an original image with the reader unit; and a correction step of performing correction on original image data read from the original image in the reading step by:

wherein the correcting step includes a step of correcting a gain and an offset in the original reflectance-read luminance characteristic of each of the first and second reader units, on a color component-by-color component basis, based on image data read by the first and second reader units from a reference original having at least two different density patches.

* * * * *